United States Patent
Jingu et al.

[19]

[11] Patent Number: 6,065,444
[45] Date of Patent: May 23, 2000

[54] DIRECT-INJECTION SPARK-IGNITION ENGINE

[75] Inventors: Nobuhisa Jingu; Hiroshi Miyakubo, both of Kanagawa, Japan

[73] Assignee: Nissan Motor Co., Ltd., Yokohama, Japan

[21] Appl. No.: 09/215,253

[22] Filed: Dec. 18, 1998

[30] Foreign Application Priority Data

Dec. 18, 1997 [JP] Japan ................................ 9-348765

[51] Int. Cl.⁷ .............................. F02F 1/42; F02B 15/02
[52] U.S. Cl. ........................ 123/301; 123/306; 123/432
[58] Field of Search .................................. 123/301, 306, 123/308, 432, 302

[56] References Cited

U.S. PATENT DOCUMENTS

| | | | |
|---|---|---|---|
| 5,138,988 | 8/1992 | Distelrath et al. | 123/432 |
| 5,167,211 | 12/1992 | Fukuma et al. | 123/308 |
| 5,394,845 | 3/1995 | Noh et al. | 123/308 |
| 5,551,392 | 9/1996 | Yamaji et al. | 123/306 |
| 5,603,299 | 2/1997 | Yuzuriha et al. | 123/308 |
| 5,983,856 | 11/1999 | Oda et al. | 123/308 |

FOREIGN PATENT DOCUMENTS

| | | |
|---|---|---|
| 0 496 029 | 7/1992 | European Pat. Off. . |
| 0 531 541 | 3/1993 | European Pat. Off. . |
| 62-191622 | 8/1987 | Japan . |
| 7-119472 | 8/1987 | Japan . |
| 2-169834 | 6/1990 | Japan . |
| 7-119472 | 5/1995 | Japan . |

OTHER PUBLICATIONS

Japanese Abstracts of Japan, Shizuo, "Spark Ignition Engine Injecting Fuel Directly Into Cylinder", Japanese application No. 62–191622, (Aug. 22, 1987).

Japanese Abstracts of Japan, Shizuo, "Inner–Cylinder Direct Jet Type Spark Ignition Engine", Japanese application No. 02169834, (Jun. 29, 1990).

*Primary Examiner*—Willis R. Wolfe
*Assistant Examiner*—Hieu T. Vo
*Attorney, Agent, or Firm*—Foley & Lardner

[57] ABSTRACT

A direct-injection spark-ignition engine having engine cylinders bored in a cylinder block, and a cylinder head mounted on the cylinder block, comprises at least one intake port provided for each of the engine cylinders. The ratio V/A of a stroke volume V (cm³) per cylinder to a cross-sectional area A (cm²) is set within a predetermined range defined by $45 \leq V/A \leq 55$, where the cross-sectional area A is a minimum cross-sectional area obtained when the at least one intake port is cut by a plane extending in a direction substantially normal to a stream line of intake air flowing through the intake port.

8 Claims, 4 Drawing Sheets

MINIMUM CROSS SECTION A OF INTAKE AIR PORT

STROKE VOLUME Vcm³

PISTON

FUEL SPRAY v (INTAKE AIR FLOW VELOCITY)

⟨DURING STRATIFIED COMBUSTION⟩

■ SWIRL FLOW

SWIRL CONTROL VALVE: CLOSED

⟨DURING HOMOGENEOUS COMBUSTION⟩

■ TUMBLE FLOW

SWIRL CONTROL VALVE: OPEN

CHARACTERISTICS DURING HOMOGENEOUS COMBUSTION

CHARACTERISTICS DURING STRATIFIED COMBUSTION

DIRECT-INJECTION SPARK-IGNITION ENGINE

The contents of Application No. TOKUGANHEI 9-348765, filed Dec. 18, 1997, in Japan is hereby incorporated by reference.

BACKGROUND OF THE INVENTION

1. Field of the Invention

The present invention relates to an in-cylinder direct-injection spark-ignition internal combustion engine, and specifically to techniques for an intake port structure capable of providing the enhanced intake-air charging efficiency and ensuring the excellent air/fuel mixture formation, and suitable for a cylinder direct-injection spark-ignition engine, capable of operating in at least two modes, namely a homogeneous combustion mode and a stratified combustion mode.

2. Description of the Prior Art

In recent years, there have been proposed and developed various in-cylinder direct-injection spark-ignition engines in which fuel is injected directly into an engine cylinder. Generally, on such direct-injection spark-ignition engines a combustion mode is switchable between a homogeneous combustion mode (or an early injection combustion mode) where fuel-injection early in the intake stroke produces a homogeneous air-fuel mixture, and a stratified combustion mode (or a late injection combustion mode) where late fuel-injection delays the event until near the end of the compression stroke to produce a stratified air-fuel mixture. The previously-noted homogeneous combustion mode is suitable for an engine operating condition such as medium or high engine speed and load, whereas the previously-noted stratified combustion mode is used generally at an engine operating condition such as low engine speed and load. The purpose of the stratified combustion is to deliver a readily ignitable mixture (richer mixture of a combustible air/fuel mixture ratio at which the mixture is ignitable by means of a spark plug provided in the combustion chamber) in the vicinity of the spark plug while forming surrounding air layer (leaner or ultra-leaner mixture often including part of the exhaust gas back through the engine or having the difficulty of direct-ignition by the spark plug) that contains little fuel, and to stable lean combustion under the condition of the low engine speed and load, and to improve fuel economy. In contrast to a conventional engine, the throttle valve is opened at the low engine load to increase the intake-air quantity, thus reducing a pumping loss. On such cylinder direct-injection spark-ignition engine (simply a DI engine) has been disclosed in Japanese Patent Provisional Publication Nos. 62-191622 and 2-169834. On the other hand, Japanese Patent Provisional Publication No. 7-119472 teaches the provision of a so-called swirl control valve to modulate in-cylinder gas motion and to create turbulent flow such as swirl flow or tumble flow, thus facilitating the mixing of air with fuel spray and improving combustion.

During the homogeneous combustion mode (or the early injection combustion mode) on the intake stroke, it could be expectable to provide the effect of cooling the intake air owing to fuel vaporization (or gasification), thus ensuring an enhanced intake-air charging efficiency (simply an induction efficiency) arising from reduction in the volumetric capacity of intake air charged. However, in conventional engines, the effects (the enhanced intake-air cooling effect and the enhanced induction efficiency) as previously discussed, were inadequate and unsatisfactory. It would be possible to highly enhance the intake-air cooling effect by promoting the fuel vaporization by virtue of increase in the flow-velocity of intake air flowing through the intake port. In addition to the above, the increase of the flow-velocity of intake air can contribute to strengthen turbulent action (for example tumble flow) in the engine cylinder, thereby assuring good mixing of fuel sprayed out with air and thus promoting homogenization of the air-fuel mixture within the combustion chamber. Also, it is possible to properly carry the fuel spray to the vicinity of the spark plug during the stratified combustion mode by swirl motion more greatly strengthened by virtue of both the increased intake-air velocity and the use of the swirl control valve. This may largely improve combustion characteristics (for example, the fuel consumption, the lean misfire limit, and the combustion stability) during the stratified combustion mode. For the reasons set forth above, it would be desirable to effectively increase an intake-air velocity by improving an intake port structure of a direct-injection spark-ignition engine.

SUMMARY OF THE INVENTION

Accordingly, it is an object of the invention to provide an in-cylinder direct-injection spark-ignition engine which avoids the aforementioned disadvantages of the prior art.

It is another object of the invention to provide an in-cylinder direct-injection spark-ignition engine which is capable of achieving enhancement of the engine output power and improvement of the combustion characteristics such as fuel economy by enhancing the induction efficiency and by increasing the intake-air velocity during the homogeneous combustion mode, and of improving the combustion characteristics such as the fuel economy, the lean misfire limit, and the stable lean combustion during the stratified combustion mode.

In order to accomplish the aforementioned and other objects of the present invention, a direct-injection spark-ignition engine having engine cylinders bored in a cylinder block, and a cylinder head mounted on the cylinder block, comprises at least one intake port provided for each of the engine cylinders, wherein a ratio V/A of a stroke volume V ($cm^3$) per cylinder to a cross-sectional area A ($cm^2$) is set within a predetermined range defined by $45 \leq V/A \leq 55$, where the cross-sectional area A is a minimum cross-sectional area obtained when the at least one intake port is cut by a plane extending in a direction substantially normal to a stream line of intake air flowing through the at least one intake port. It is preferable that the direct-injection spark-ignition engine may further comprise a swirl control valve disposed in the at least one intake port, for strengthening in-cylinder swirl flow created by the intake air. More preferably, the at least one intake port has a narrowed-down portion for locally narrowing down a cross section thereof, while providing the ratio V/A defined by $45 \leq V/A \leq 55$. A minimum cross-sectional area of the narrowed-down portion is set at the minimum cross-sectional area A. It is more preferable that a cross section of the narrowed-down portion is dimensioned so that the minimum cross-sectional area of the narrowed-down portion is obtained substantially in a middle position of the at least one intake port. Preferably, the cross section of the narrowed-down portion may be dimensioned so that the cross section gradually increases from the middle position to an upstream position of the at least one intake port and gradually increases from the middle position to a downstream position of the at least one intake port. More preferably, the at least one intake port has a substantially straight port portion. It is preferable that the angle between the central axis of the substantially straight port portion and the bottom face of the cylinder head is set within a predetermined angle range defined by $30° \leq \theta \leq 50°$.

DESCRIPTION OF THE PREFERRED EMBODIMENTS

Figure 1A:
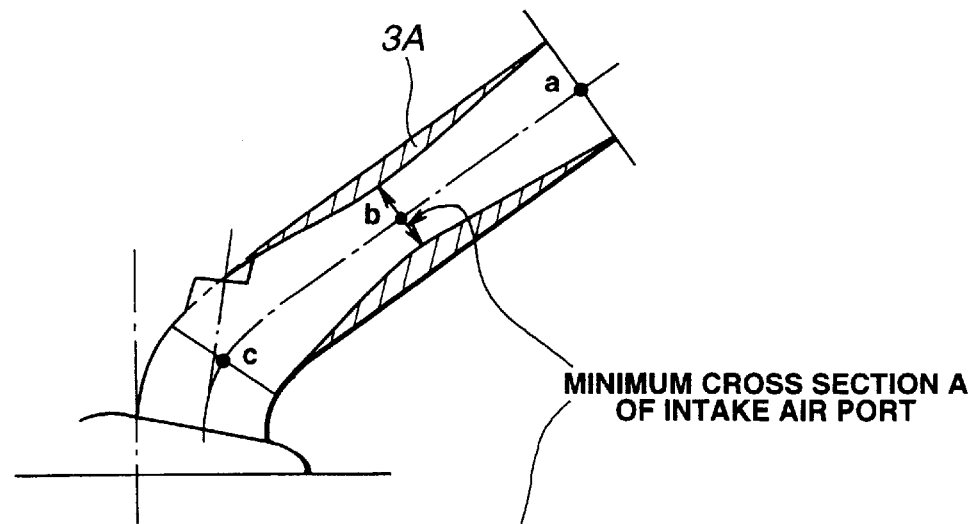
FIG. 1A is an enlarged longitudinal cross-sectional view illustrating the essential part of an intake pipe (or an intake port structure) of a cylinder direct-injection spark-ignition engine of the invention, partly sectioned at the elliptical section shown in FIG. 1B.
Figure 1B:
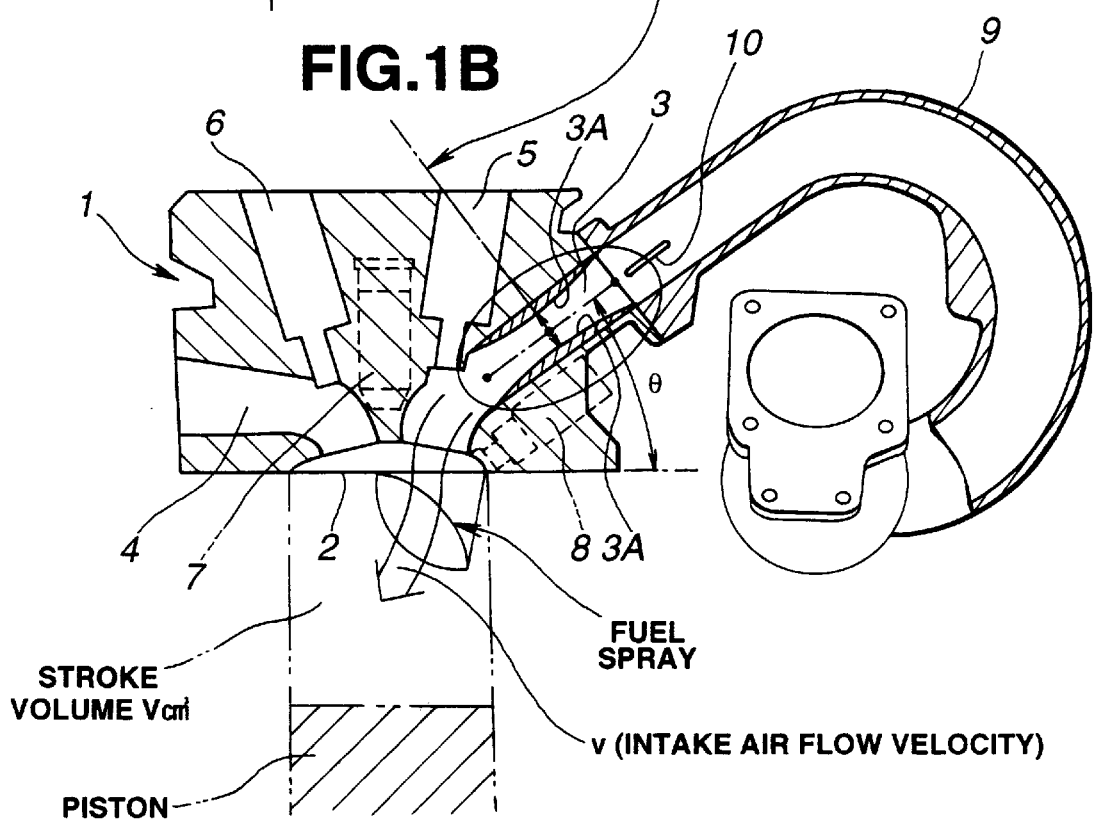
FIG. 1B is a longitudinal cross section of the cylinder head and intake port structure of the embodiment.
Figure 2A:
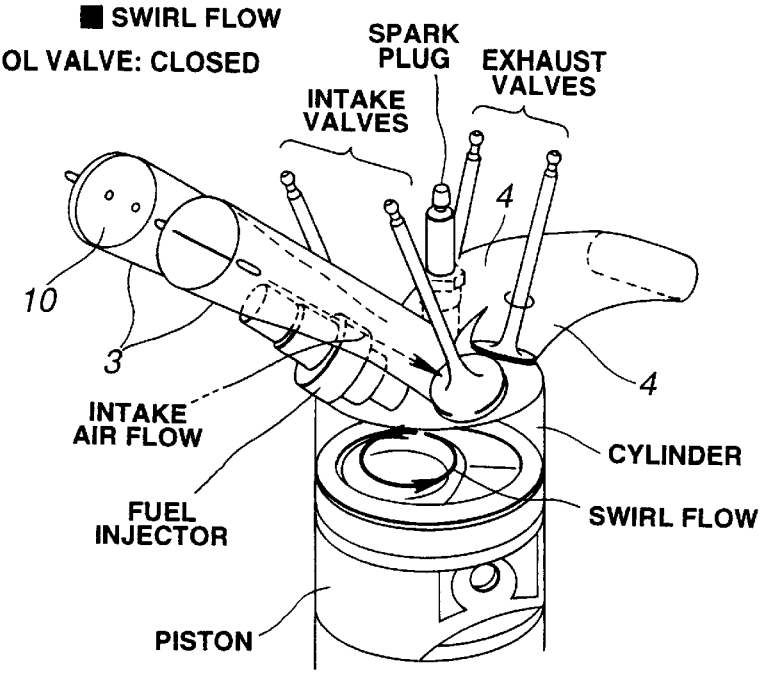
FIG. 2A is a perspective view illustrating the layout between the intake port, the engine cylinder, the fuel injector valve, the spark plug, constructing the direct-injection spark-ignition engine of the embodiment, indicating the interior of the engine operating at the stratified combustion mode.
Figure 2B:
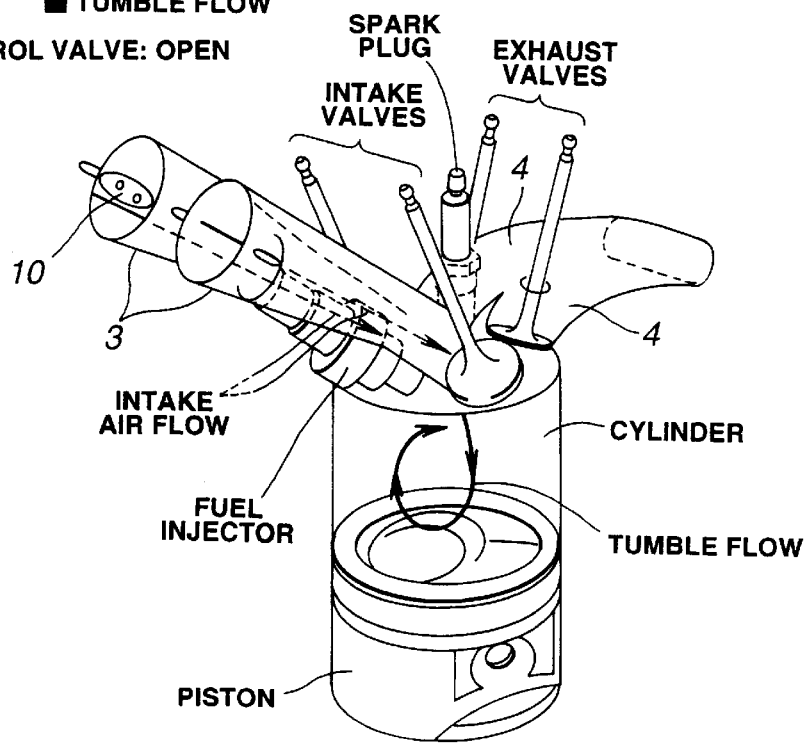
FIG. 2B is a perspective view illustrating the layout between the intake port, the engine cylinder, the fuel injector valve, the spark plug, constructing the direct-injection spark-ignition engine of the embodiment, indicating the interior of the engine operating at the homogeneous combustion mode.

Referring now to the drawings, particularly to FIGS. 1A and 1B, the direct-injection engine of the invention is exemplified in case of an in-cylinder direct-injection spark-ignition DOHC four-valve engine employing two intake-port valves and two exhaust-port valves for each individual engine cylinder. As seen in FIG. 1B, the cylinder head 1 is mounted on a cylinder block (not numbered), and is formed with two intake-valve ports (intake ports) 3 and two exhaust-valve ports (exhaust ports) 4, all communicating the combustion chamber 2. The combustion chamber 2 is defined by the recessed portion formed at the bottom of the cylinder head 1 and the piston crown (not numbered) of the piston which is fitted to an engine cylinder formed in the cylinder block, and is movable through a stroke in the cylinder. The two intake ports (3, 3) have the substantially same shape and size. Two intake valves (not numbered) are installed at an intake-valve mounting portion 5 of the cylinder head 1, to permit intake air (or induced air) to be drawn into the combustion chamber through the intake ports 3 with the intake valves opened. Two exhaust valves (Not numbered) are installed at an exhaust-valve mounting portion 6 of the cylinder head 1, to permit burned gases to exhaust from the engine cylinder with the exhaust valves opened during the exhaust stroke. The cylinder head 1 is also formed with a substantially centrally-located spark-plug installation hole 7 into which the spark plug is screwed so that the tip of the spark plug is exposed to the center of the combustion chamber 2. A fuel injector valve installation hole 8 is formed in the cylinder head in the vicinity of the two intake ports (3, 3), more precisely, between the two intake ports (3, 3), to install the fuel injector valve therein, so that the injection nozzle of the fuel injector is projected toward within the outer peripheral portion of the combustion chamber 2, and so that fuel is injected or sprayed out downwards obliquely with respect to the horizontal plane of the bottom face of the cylinder head (or the upper face of the cylinder block) (see the conically-injected fuel spray of FIG. 1B). The fuel-injection timing is set at the intake stroke in the homogeneous combustion mode, whereas the fuel-injection timing is set at the compression stroke in the stratified combustion mode. In the shown embodiment, a swirl control valve 10 is located in the middle of the intake pipe 9 connected to or communicating with one of the intake ports (3, 3). As described later, the swirl control valve serves as a turbulence control means or a swirl-flow plus tumble-flow control means. Generally, the opening and closing of the swirl control valve 10 is electronically controlled by means of an electronic engine control unit (ECU) or an electronic engine control module (ECM). As seen in FIG. 2A, the swirl control valve 10 is closed during the stratified combustion mode, to create swirling gas flow, often called "in-cylinder swirl flow", simply "swirl flow". As seen in FIG. 2B, the swirl control valve 10 is opened during the homogeneous combustion mode, to create in-cylinder vertical vortex, often called "in-cylinder tumble flow", simply "tumble flow".

In the engine of the embodiment, the intake port structure is designed and dimensioned so that the velocity v of intake-air flow entering the engine cylinder, which will be hereinafter referred to as an "intake-air flow velocity v", is effectively increased, for the purpose of fully enhancing the induction efficiency (the intake-air charging efficiency) arising from the enhanced intake-air cooling effect obtainable as a result of rapid fuel vaporization during the homogeneous combustion mode. The intake-air flow velocity v is represented as a ratio V/A of the stroke volumetric capacity (simply the stroke volume) V ($cm^3$) to the minimum cross-sectional area A ($cm^2$) of the intake port 3. Hereupon, the cross-sectional area of the intake port means a total cross-sectional area obtained when the two intake ports (3, 3) is cut by a plane extending in a direction substantially normal to a stream line of intake air flowing through each of the intake ports 3 associated with one of the engine cylinders, because, in the embodiment, the two intake ports (3, 3) are provided for each of the engine cylinders. In the embodiment, the two intake ports, substantially parallel to each other, are formed for every engine cylinder, and therefore the intake-port cross-sectional area per cylinder is the sum of the cross-sectional area of one of the two adjacent intake ports, taken in a direction substantially normal to a stream line of intake air flowing through the one intake port, and the crosssectional area of the other intake port of the same cylinder, taken in a direction substantially normal to a stream line of intake air flowing through the other. As can be appreciated, assuming that the stroke volume V ($cm^3$) is fixed to a constant value, the minimum intake-port cross-sectional area A ($cm^2$) must be decreased in order to increase the intake-air flow velocity v. However, if the minimum intake-port cross-sectional area A is decreased for the increase in the intake-air flow velocity v, there is a tendency the intake-air flow resistance to increase. The increased intake-air flow velocity v contributes to enhancement of the induction efficiency, whereas the increased intake-air flow resistance contributes to reduction of the induction efficiency. To balance these two contradictory factors, that is, the increased intake-air flow velocity v and the increased intake-air flow resistance, it is necessary to optimally set the minimum cross-sectional area A or the ratio V/A. By way of repetition of various sorts of experiments, the inventors of the invention have discovered optimal values of the previously-described ratio V/A, as discussed in detail hereunder by reference to FIGS. 3 and 4.

Figure 3:
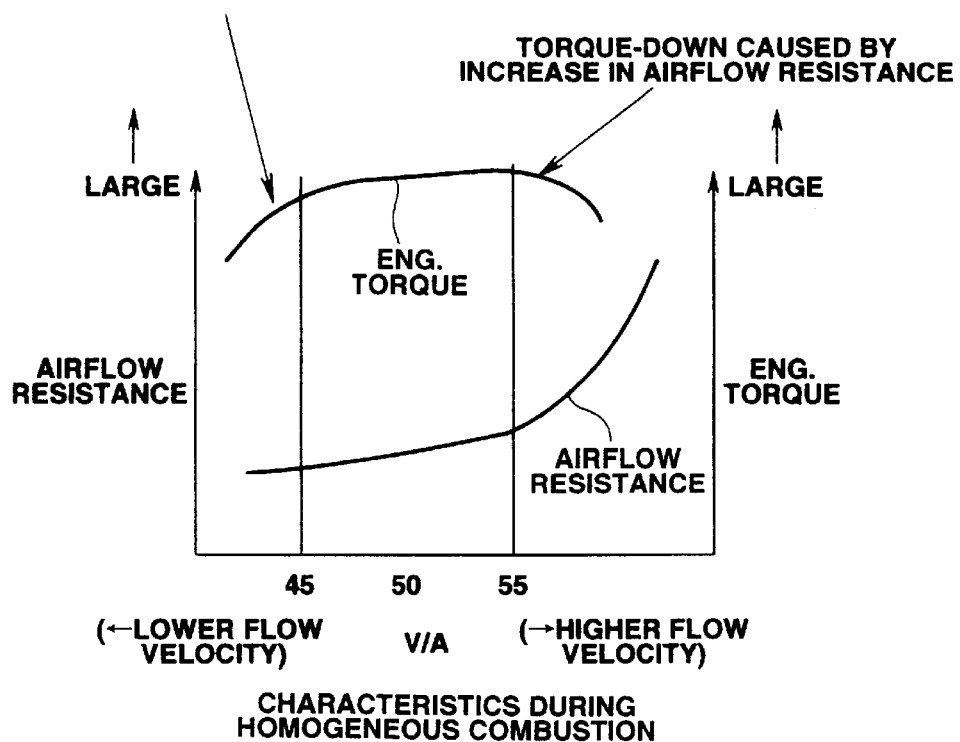
FIG. 3 is characteristic curves illustrating the relationship among the ratio (V/A) of the stroke volume (V) to the minimum cross-sectional area (A) of the intake port, the air-flow resistance, and the engine torque, obtained at the homogeneous combustion mode.

Referring now to FIG. 3, there are shown the air-flow resistance characteristic curve and the engine-torque characteristic curve at various ratios (V/A) during the homogeneous combustion mode. As seen in FIG. 3, during the homogeneous combustion (i.e., during the early injection combustion mode on the intake stroke), when the ratio V/A is greater than 55, that is, in case of V/A>55, the intake-air flow velocity v tends to increase remarkably, while the flow resistance of intake air flowing through the intake port 3 tends to increase to excess. The above-mentioned intake-air flow resistance has been measured by the inventors under a specified condition where the intake pipe is removed and also the intake valve is mounted on the cylinder head. As a result of the excessively great intake-air flow resistance, when V/A>55, the induction efficiency (the intake-air charging efficiency) is reduced remarkably, thus lowering the engine torque. On the other hand, when V/A<45, the intake-air flow resistance tends to reduce, however the intake-air flow velocity v cannot be increased adequately. This lowers the effect of cooling the intake air, and consequently results in reduction in the induction efficiency. Additionally, owing to the undesiredly decreased intake-air flow velocity v, the turbulent action of air (e.g., the tumble flow) within the cylinder (or the combustion chamber) cannot be strengthened adequately. As a result, the mixing between fuel spray and air, that is, the homogenization of the air-fuel mixture cannot be promoted satisfactorily. This lowers the engine torque. As seen in the intermediate portions ($45 \leq V/A \leq 55$) of the two characteristic curves shown in FIG. 3, the inventors of the invention have discovered that it is preferable that the ratio V/A is set within the range defined by $45 \leq V/A \leq 55$ when the engine is operating in the homogeneous combustion mode, in order to promote fuel vaporization by virtue of the increased intake-air flow velocity, and to enhance the induction efficiency utilizing the excellent intake-air cooling effect obtained by the promoted fuel vaporization, and consequently to enhance the engine torque, and also to strengthen the in-cylinder gas motion (for example, the tumble flow) with the increased intake-air flow velocity v, and consequently to ensure good mixing and adequate homogenization of the air-fuel mixture and to improve combustion.

Figure 4:
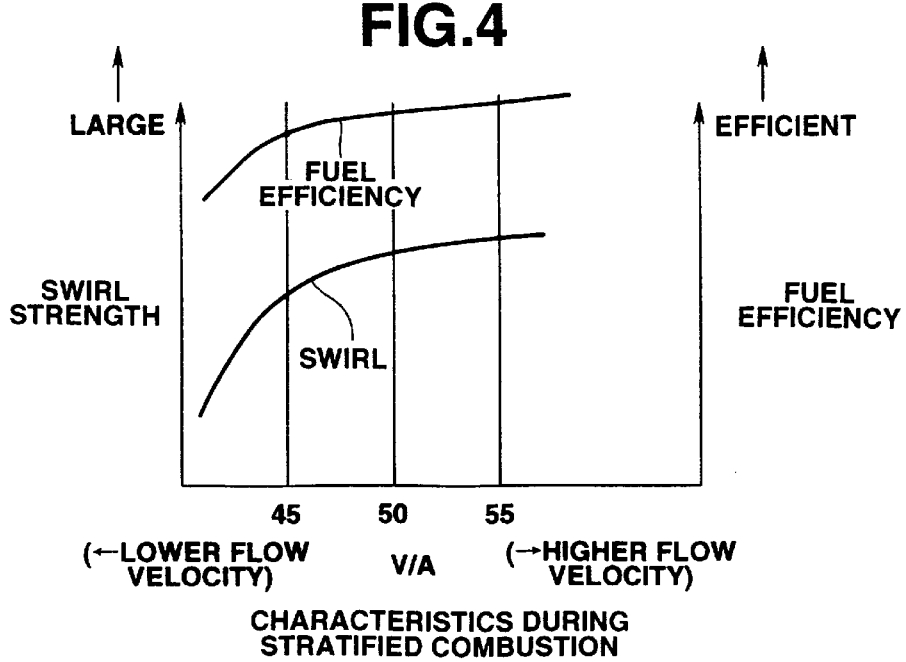
FIG. 4 is characteristic curves illustrating the relationship among the stroke volume/minimum cross-sectional area ratio (A/V), the swirl strength, and the fuel consumption, obtained at the stratified combustion mode.

Referring now to FIG. 4, there are shown the swirl-strength characteristic curve and the fuel-consumption characteristic curve at various ratios (V/A) during the stratified combustion mode. The test is made by the inventors of the invention under a specified condition where the swirl control valve 10 is closed so as to strengthen the swirl flow within the cylinder. As seen in FIG. 4, during the stratified combustion mode (i.e., during the late injection combustion mode on the compression stroke), the airflow velocity v can be effectively increased, when the ratio V/A is set within the previously-noted predetermined range defined by $45 \leq V/A \leq 55$. Therefore, in the engine of the embodiment, the swirl flow can be more highly strengthened by way of full cooperation of the increased intake-air flow velocity v and the swirl control valve 10 closed. Hitherto, only the use of the swirl control valve is considered and the ratio V/A is below 45. In comparison with the conventional engine having the ratio defined by V/A<45, the swirl flow can be sufficiently strengthened or the swirl ratio can be satisfactorily enhanced by the improved engine of the invention having the ratio defined by $45 \leq V/A \leq 55$. The more strengthened in-cylinder swirl flow functions to more effectively carry the fuel spray injected to the vicinity of the spark plug during the stratified combustion mode. This improves the combustion characteristics (e.g., the fuel consumption, the lean misfire limit at which the air/fuel mixture is no longer ignitable, and the combustion stability). Due to the optimal setting ($45 V/A \leq 55$) of the ratio V/A, a required engine performance or an overall engine performance in the homogeneous combustion mode, such as engine output power and fuel consumption, can be largely improved. Additionally, the required engine performance in the stratified combustion mode, such as minimum fuel consumption, enhanced lean misfire limit, and enhanced combustion stability, can be highly attained. To ensure the previously-noted optimal setting ($45 \leq V/A \leq 55$), the cross-sectional area of the intake port can be dimensioned so that the minimum cross-section area A is formed over the entire length of the intake port 3. Alternatively, only a part of the intake port 3 may be formed as a narrowed-down portion (or a throttling portion) 3A having the minimum cross-sectional area A, in order to locally narrow down the cross section of the intake port 3, while providing the ratio defined by $45 \leq V/A \leq 55$. The latter intake-port structure is superior to the former intake-port structure in that the flow resistance of intake air flowing through the intake port 3 is kept as small a value as possible, while providing the ratio defined by $45 \leq V/A \leq 55$. Therefore, the intake-port structure (having the partly narrowed-down portion 3A) shown in FIG. 1A enables an easy increase in the intake-air flow velocity v, remarkably enhancing the induction efficiency. Thus, the required engine performance in the homogeneous combustion mode and the required engine performance in the stratified combustion mode can be attained at a higher level.

Figure 5:
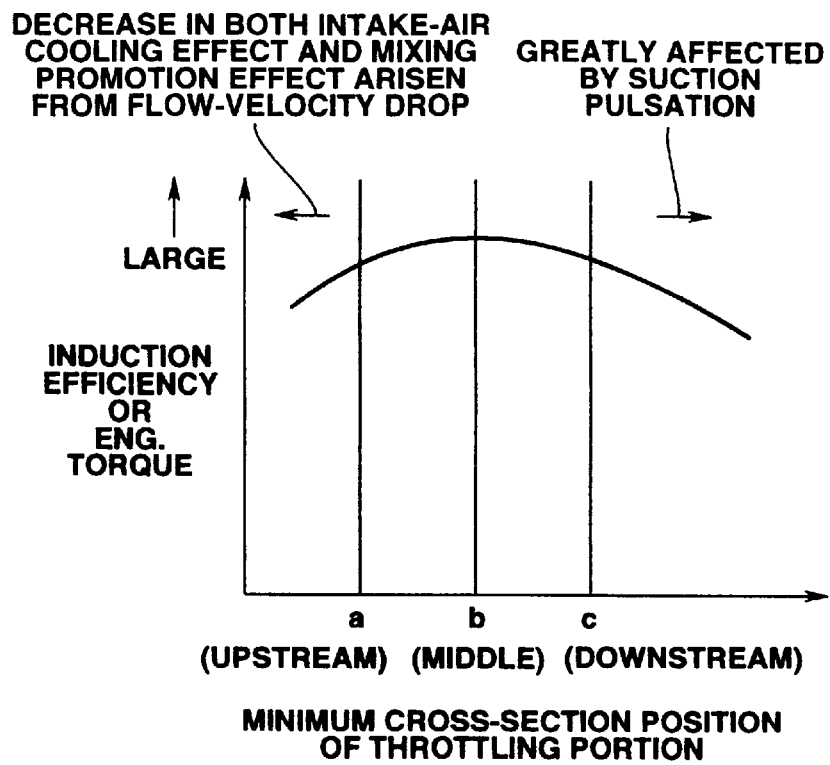
FIG. 5 is a characteristic curve illustrating changes in the induction efficiency (or the engine torque), depending on three different positions or locations a, b, and c, either one of which has the partial, minimum cross-sectional area (the greatest throttling portion, or narrowed-down portion of the intake port).

Referring now to FIG. 5, there is shown the relation between the induction efficiency (or the engine torque) and the position of the locally-formed, narrowed-down portion 3A of the intake port 3. As seen from the enlarged cross section shown in FIG. 1A, the position a corresponds to the upstream end of the substantially straight portion of the intake port 3, the position b corresponds to the middle portion of the substantially straight portion of the intake port 3, and the position c corresponds to the downstream end of the substantially straight portion of the intake port 3. The case where the narrowed-down portion 3A is formed such that the minimum cross section of the narrowed-down portion 3A matches the position a, is superior to the other case where the narrowed-down portion 3A is formed such that the minimum cross section of the narrowed-down portion 3A matches the position b or the position c, from the viewpoint of avoidance of undesired separation of airflow from the inner wall of the intake port 3 and from the viewpoint of avoidance of degraded flow-straightening performance. As discussed hereunder, the specified shape of narrowed-down portion 3A located at the middle position b of the intake port 3 is effective to suppress or avoid both undesired separation of airflow from the inner wall of the intake port 3 and degradation of the airflow straightening performance, while keeping the airflow resistance as small as possible and satisfying the specified condition of $45 \leq V/A \leq 55$. As shown in FIGS. 1A and 1B, as regards the specified shape of the locally-narrowed-down portion 3A, the cross section of the intake port 3 is narrowed down at the middle position b between the substantially upstream end a and the substantially downstream end c, and additionally the cross section is designed to gradually moderately increase from the middle position b to the upstream position a, and to gradually moderately increase from the middle position b to the downstream position c. The locally, moderately narrowed-down portion 3A greatly contributes to avoidance of undesired separation of airflow from the inner wall of the intake port 3 and avoidance of degraded flow-straightening performance. With the airflow velocity v increased, the narrowed-down portion 3A located at the middle position b can effectively produce the previously-described various effects, such as the promotion of fuel vaporization, the enhanced intake-air cooling effect, the enhanced induction efficiency, the enhanced engine output power, the strengthened in-cylinder gas motion involving the swirl motion and tumble motion, the promotion of mixing and homogenizing the air/fuel mixture, the improvement of combustion.

Figure 6:
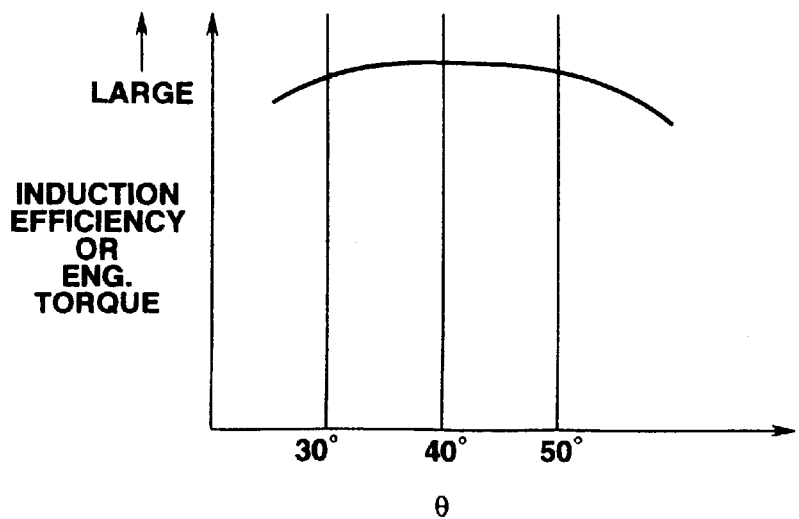
FIG. 6 is a characteristic curve illustrating changes in the induction efficiency (or the engine torque), depending on variations in the angle ($\theta$) between the central axis of the substantially straight portion of the intake port and the bottom face of the cylinder head (or the upper face of the cylinder block).

Referring now to FIG. 6, there is shown the relation between the induction efficiency (or the engine torque) and the angle (θ) between the central axis of the substantially straight port portion of the intake port and the bottom face of the cylinder head (or the upper face of the cylinder block). As seen in FIG.6, the angle range of $30° \leq \theta \leq 50°$ (or the angle range defined by $40° \pm 10°$) is more effective to strengthen the in-cylinder gas motion (such as swirl flow and tumble flow). When the previously-noted angle θ is set within the predetermined angle range defined by $30° \leq \theta \leq 50°$, the fuel spray injected from the injector valve can be effectively impinged against or collided on the air flow entering the cylinder. This ensures the plural effects as previously discussed, in both the homogeneous combustion mode and the stratified combustion mode.

In the shown embodiment, the direct-injection spark-ignition engine employing two intake ports per one engine cylinder, and an injector valve located between the two intake ports, is exemplified. The concept of the invention is applicable to the other arrangement of the engine, for example a direct-injection spark-ignition engine employing a sole intake port per one cylinder, and an injector valve located near the sole intake port. In this case, the minimum cross-sectional area A of the intake port corresponds to an area of the minimum cross section of the narrowed-down portion of the sole intake port. The use of the swirl control valve 10 is effective to improve both homogeneous-combustion characteristics and stratified-combustion characteristics. For the purpose of improving only the homogeneous-combustion characteristics, the swirl control valve 10 may be eliminated. In the shown embodiment, the swirl control valve 10 is provided in the middle of the intake pipe 9 connected to one of the two intake ports to create the swirl flow with the one intake port closed by the swirl control valve and the other intake port constantly opened during the stratified combustion mode, and to create the tumble flow with the one intake port opened by the swirl control valve and the other intake port constantly opened. Alternatively, the swirl control valve may be replaced a swirl control valve as disclosed in the previously-described Japanese Patent Provisional Publication No. 7-119472. The swirl control valve serves to close only the lower-half cross section of the intake pipe (or the intake-air passage) to strengthen the in-cylinder gas motion. Furthermore, the narrowed-down portion 3A having the minimum cross section of the intake port can be formed in each of two intake ports of each cylinder. Alternatively, the narrowed-down portion 3A may be formed in either one of the two intake ports of each cylinder. In the shown embodiment, the cross sections of the two intake ports (3, 3), included in the associated cylinder, are substantially identical in shape and size. That is, the two intake ports (3, 3) are substantially congruent. Thus, the cross-sectional area Ak of one of the intake ports is designed to be almost equal to the cross-sectional area $A_m$ of the other. In lieu thereof, in a multi-intake-port engine having a plurality of intake ports for every engine cylinders, the minimum cross-sectional area $A_m$ of a certain intake port included in the associated cylinder may be different from the minimum cross-sectional area $A_k$ of the other intake port included in the same cylinder, if the sum $(A_1+A_2+A_k+ \ldots +A_m+A_n)$ of the minimum cross-sectional areas $A_1, A_2, \ldots, A_n$ corresponds to the total minimum cross-sectional area A, and the condition of $45 \leq V/A \leq 55$ is satisfied.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A direct-injection spark-ignition engine having engine cylinders bored in a cylinder block, and a cylinder head mounted on the cylinder block, comprising:

at least one intake port provided for each of said engine cylinders, wherein a ratio V/A of a stroke volume V (cm$^3$) per cylinder to a cross-sectional area A (cm$^2$) is set within a predetermined range defined by $45 \leq V/A \leq 55$, where the cross-sectional area A is a minimum cross-sectional area obtained when said at least one intake port is cut by a plane extending in a direction substantially normal to a stream line of intake air flowing through said at least one intake port.

2. The direct-injection spark-ignition engine as claimed in claim 1, which further comprises a swirl control valve (10) disposed in said at least one intake port, for strengthening in-cylinder swirl flow created by the intake air.

3. The direct-injection spark-ignition engine as claimed in claim 1, wherein said at least one intake port comprises a plurality of intake ports (3, 3), and which further comprises a swirl control valve (10) disposed in at least one of the plurality of intake ports, for strengthening in-cylinder swirl flow created by the intake air.

4. The direct-injection spark-ignition engine as claimed in claim 3, wherein the plurality of intake ports comprise two intake ports (3, 3), and said swirl control valve (10) is disposed in one of the two intake ports (3, 3), for creating in-cylinder swirl flow when the swirl control valve (10) is closed, and for creating in-cylinder tumble flow when the swirl control valve (10) is opened.

5. The direct-injection spark-ignition engine as claimed in claim 1, wherein said at least one intake port has a narrowed-down portion (3A) for locally narrowing down a cross section of said at least one intake port, while providing the ratio V/A defined by $45 \leq V/A \leq 55$, and a minimum cross-sectional area of the narrowed-down portion (3A) is set at the minimum cross-sectional area A.

6. The direct-injection spark-ignition engine as claimed in claim 5, wherein a cross section of the narrowed-down portion (3A) is dimensioned so that a minimum cross-sectional area is obtained substantially in a middle position (b) of said at least one intake port.

7. The direct-injection spark-ignition engine as claimed in claim 6, wherein the cross section of the narrowed-down portion (3A) is dimensioned so that the cross section gradually increases from the middle position (b) to an upstream position (a) of said at least one intake port and gradually increases from the middle position (b) to a downstream position (c) of said at least one intake port.

8. The direct-injection spark-ignition engine as claimed in claim 1, wherein said at least one intake port has a substantially straight port portion, and an angle $\theta$ between a central axis of the substantially straight port portion of said at least one intake port and a bottom face of the cylinder head is set within a predetermined angle range defined by $30° \leq \theta \leq 50°$.

* * * * *